United States Patent [19]

Fisher et al.

[11] 4,315,113

[45] Feb. 9, 1982

[54] ACTUATOR SWITCH FOR REMOTE CONTROL REARVIEW MIRRORS

[75] Inventors: Robert J. Fisher, Livonia; Lawrence R. Lefever, Sterling Heights, both of Mich.

[73] Assignee: Harman International Industries, Inc., Grandville, Mich.

[21] Appl. No.: 113,261

[22] Filed: Jan. 18, 1980

[51] Int. Cl.³ .......................... H01H 9/26; G02B 5/08

[52] U.S. Cl. .................................. 200/5 R; 200/1 V; 200/6 A; 350/289

[58] Field of Search .............. 200/5, 6 A, 153 K, 1 V; 350/289, 302, 307

[56] References Cited

U.S. PATENT DOCUMENTS

| | | | |
|---|---|---|---|
| 2,896,034 | 7/1959 | Nolden et al. | 200/6 A |
| 3,115,555 | 12/1963 | Lescarboura | 200/5 R |
| 3,222,584 | 5/1965 | Du Rocher | 318/280 |
| 3,303,403 | 12/1964 | Bonanno | 318/257 |
| 3,419,684 | 12/1968 | Lord et al. | 179/99 |
| 3,459,470 | 3/1969 | Hahn | 350/289 |
| 3,467,801 | 5/1967 | Matthews | 200/157 |
| 3,483,337 | 12/1969 | Johnstone et al. | 200/6 |
| 3,688,062 | 8/1972 | Yamamoto et al. | 200/153 K |
| 3,784,746 | 1/1974 | Hess | 179/1 GQ |
| 3,965,315 | 6/1976 | Wuenn | 200/6 A |
| 4,158,483 | 6/1979 | Fisher | 350/289 |

FOREIGN PATENT DOCUMENTS

| | | | |
|---|---|---|---|
| 1790265 | 3/1973 | Fed. Rep. of Germany | 200/6 A |

*Primary Examiner*—J. D. Miller
*Assistant Examiner*—D. L. Rebsch
*Attorney, Agent, or Firm*—Miller, Morriss and Pappas

[57] ABSTRACT

A shortened control switch structure useful in electrical remote control rearview mirrors and serving a pair of remotely located reversible motors and selectively permitting either of the motors to be operated in the forward or reverse direction by movement in the switch and where the base closure of the switch supports stationary contacts in opposed paired relation and the stationary contacts are swaged into the closure and against connecting leads and where the connecting leads extend generally radially from the base closure. The switch is of the type that recenters upon release in accord with a bias applied at the contacts. The contactors are press fitted into recesses and self-seat against removal and in electrical contact with corresponding leads. The contactors are provided with annular spaced apart wedge rings and displace softer material upon entry and in firm contacting displacement of the leads.

4 Claims, 8 Drawing Figures

ACTUATOR SWITCH FOR REMOTE CONTROL REARVIEW MIRRORS

BACKGROUND OF THE INVENTION

Electrical remote control rearview mirrors are now available and these require a control which is familiar to drivers of automobiles and which ideally appears and functions in an external manner as prior art mechanical pendant actuators. Prior switches having a motion mimicking desired movement in respect to the mirror were devised and for the most part, were too bulky and too elongate to be readily applicable in automotive interiors.

The present invention relates to an improved and compact electrical control switch structure and, more particularly, to an electrical control switch which is selectively operable to any of four separate operating positions and for driving any one of plural remotely located motors in selected forward or reverse directions and which, upon release, bias-returns to a neutral centered position. The improved switch is compact and is confined in an elongate case having a bottom closure and an axially extending actuator handle. Compactness is extended by radial movement of the leads from the bottom closure plate transverse to the principal axis of the switch and the bottom closure plate supports the contactors and leads. The contactors are driven into the closure plate and through the terminal ends of leads. The leads and contactors are driven into firm keyed relation in the closure plate and nest in grooves provided in the closure plate. Upsets are provided on the shank of the contactors which enhance guided swaging with subsequent keying and stock-envelopment, the stock closing behind the upsets to resist removal of the contactors and their connected leads. Because of the high precision of the swage-wedge entry to prepositioned openings, a higher reliability in the switch was obtained.

While a wide variety of reversing switches are well known in the prior art, none of such devices as known to applicant are sufficiently compactly arranged and geometrically oriented as to provide a relatively short pendant type control for remote control rearview mirrors and where the manipulation of the switch corresponds in movement direction to the selected adjustment of the remotely positioned mirror. For the most part, electrical remote control rearview mirrors are moved up and down (dive and climb) by one reversible motor and are turned or pivoted to the left and to the right by another reversible motor.

Accordingly, the control switch must selectively control tilting of the mirror in any selected position and the switch must be able to selectively control relative pivoting in a horizontal plane of the mirror in any selected tilt position and upon release, the control switch should center bias to a non-driving position. To achieve such a structure compactly and to construct such a switch economically is the principal object of the present invention.

In the assembly of the switch of the present invention, electrical connection at assembly was achieved using contactor structures which seat themselves against removal after a relatively easy press fit entry. This contribution has application to electrical apparatus having contacting posts and can be adapted to high productivity with low overall cost and repetitive accuracy without sacrifice of precision and electrical reliability. This aspect of the present invention is particularly valuable where precision location of the posts or contacts is a requisite of the electrical design.

Thus, another object is to provide a new and improved control swtich for electrical apparatus in which directional control in two planes is achieved. Still another object is to provide an electrical remote control switch which is trouble-free and especially adapted to a remote controlled rearview mirror structure. Another object is to provide new precision in locating contacts which utilize a swage-like impingement on conducting leads. Other objects, including compactness, reliability and economy, will be perceived as the description proceeds.

IN THE DRAWINGS

FIG. 4 is a cross-section elevation view as in FIG. 2 and showing the switch of the present invention manually tilted to close control in one direction to a reversible electrical motor or the like.

GENERAL DESCRIPTION

Figure 1:
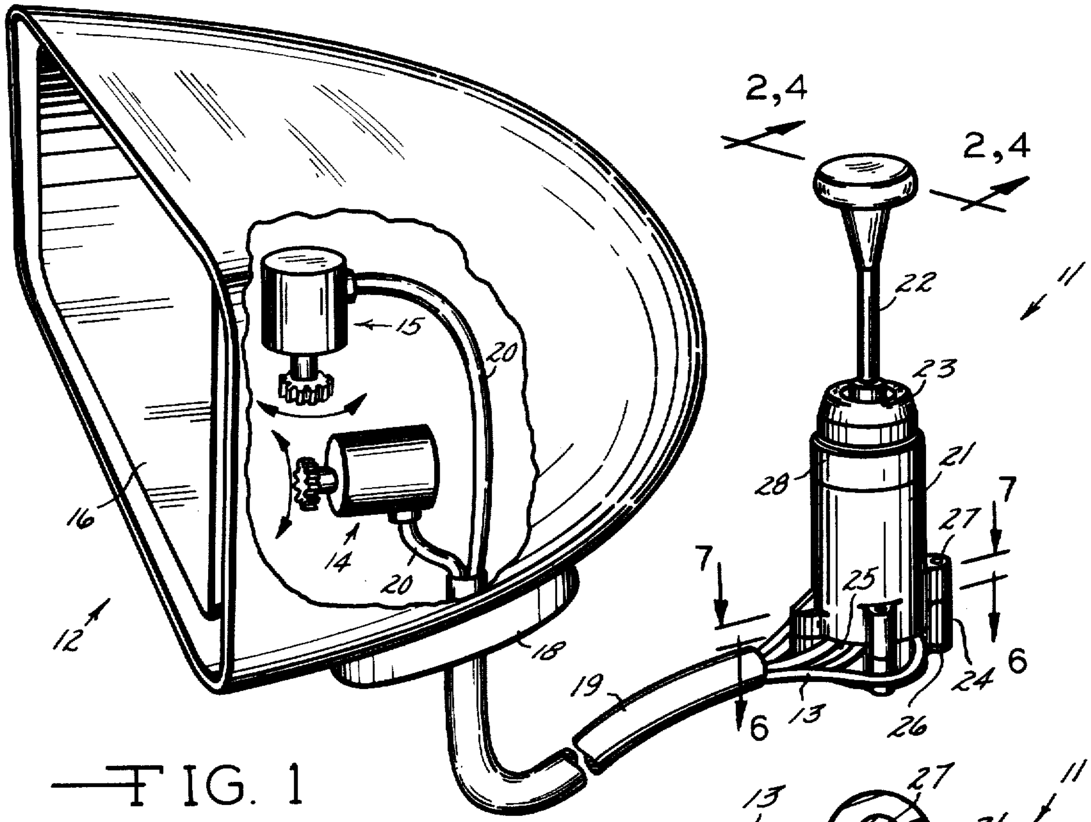
FIG. 1 is a perspective view of a switch improved in accord with the present invention and remotely in control of two motors acting in separate transverse planar control over a mirror surface.

In general, the improved switch of the present invention is used for control over a remotely controlled rearview mirror and in such mirrors as are powered to achieve a tilting action in a vertical plane and a swivelling action in a transverse plane to the vertical plane. In most electrical remote control mirrors, the movement is achieved by use of two reversible drive motors. One provides movement in one plane and the other motor provides movement in a plane transverse to the first plane. The switch should be compact and must have a movement keyed in direction to the desired movement sought in the remote mirror. For example, as the switch lever is lifted, it is desirable that the mirror raise in a relative horizontal plane. As the switch lever or handle is lowered, the mirror should tilt downwardly lowering its view in the horizontal plane. As the lever is moved to the left, the mirror should swing or pivot to the left and as the lever is moved to the right, the mirror should turn or pivot to the right. These directions, under control, are referenced to the mirror and actuator switch as viewed by the driver or operator inside of an automobile or other vehicle.

The actuator switch which provides such universal remote control has a first pair of opposed positions which selectively operate the first of the reversible motors in a forward and a reverse direction. The actuator switch has a second pair of opposed positions which selectively operate a second of the reversible motors in a forward and a reverse direction. The switch achieves a reversal of polarity selectively applicable in the two planes of movement. The selection of these positions is by manual movement and upon release of the switch after such selected movement, a bias is included in the structure which self-centers the switch to a neutral non-driving position. Leads run from the switch and to the motors in the indicated paired relation. In each pair one lead, when energized, directs forward motion in one motor and the other and opposite lead, when energized, directs reverse motion in the same motor. A source of electrical energy is connected to the switch and the switch is separately grounded. The switch includes a controllably guided element which closes a circuit to one of said motors in one of said direction modes in each extreme of four extreme positions. The switch includes a base closure which has generally radially disposed openings for the leads and the leads are in an electrical conducting contact with the contactor posts.

The contactors and conducting pins in the present invention, as assembled to a non-conducting base, are elongate and have an upset entry shank such as to provide a guided entry into an opening in a non-conducting base, the opening having a diameter about the same as the shank diameter and less than the size of the upset diameter, so that upon axial press insertion into the opening, the non-conducting material flows around the upsets and closes behind the upsets. This prevents the pin or contactor from removal and in an aligned position guided by the axis of the opening into which the pin was inserted. The upsets are preferably wedged radial flanges, the outside diameter of the wedged flanges exceeding the prepared diameter of the opening. Assembly is greatly facilitated where the contactors are driven into the non-conducting base over the lead wires and thereby assuring good electrical contact.

SPECIFIC DESCRIPTION

Referring to the drawings and with first attention to the FIG. 1 thereof, the use environment of the switch 11 of the present invention is easiest appreciated. The switch 11 is remotely connected to control the rearview mirror 12 by means of the electrical leads 13 which are operably connected in pairs (forward and reverse) to each of the motors 14 and 15. As viewed from the point of view of a driver or operator, the mirror motor 15 pivots the mirror glass 16 in a horizontal plane, as shown. The motor 14 tilts the mirror glass 16 up or down in the mirror housing 17. Various drive connections are possible, but in the FIG. 1 the motors 14 and 15 drive a gear train to achieve the desired motion. The leads 13 include a ground and also a power line, the latter of which runs from a power source, not shown, as would be found in an automotive battery, for example. The pedestal portion 18 of the mirror housing 17 provides means for securing the mirror 12 to the exterior surface of a vehicle and four of the leads 13 are passed into the housing 17 through the pedestal 18 encased collectively in a tubular protective sheath 19 and the pairs of leads 13 to each motor 14 and 15 are grouped within the smaller tubular protective sheaths 20. Accordingly, the mirror and actuator assembly may be preassembled where desired and the relatively small diameter of the actuator switch 11 can be easily passed through an opening covered by the pedestal 18 for internal mounting in a vehicle. Where expediency suggests separate connection, the actuator leads 13 may be broken and color coded for connection to the mirror 12 at installation. Suitable coupling of the leads may be achieved, as desired, intermediate the actuator 11 and mirror unit 12. In such instances, suitable gasketing and mounting means are provided attaching pedestal 18 to vehicle body (not shown). The actuator switch 11 is enclosed in the switch case 21. The case 21, as shown, includes an actuating lever or handle 22 which extends axially from the case 21 and is normally biased to center on the axis, as shown. As will be seen, the lever 22 is selectively and manually movable in only two paths from the center position to four extreme positions. The weather or dust boot 23 provides a resilient cover closing on the lever 22 and the cylindrical top portion of the case 21. This allows unimpeded deflection while closing the case 21 against entry of foreign material. A base closure 24 is provided having radially oriented openings 25 for the leads 13. A bottom plate 26 closes registrably on the base closure 24 and is the retaining means for the entire switch assembly and secured as by rivets 27 or other suitable fasteners.

As will be appreciated, the actuator 11 is mounted in the vehicle within easy reach of the driver or operator and is attached to the vehicle by an escutcheon ring or clamp (not shown) and the handle 22 projects generally toward the driver. The mounting ring 28 facilitates the interior mounting.

Figure 2:
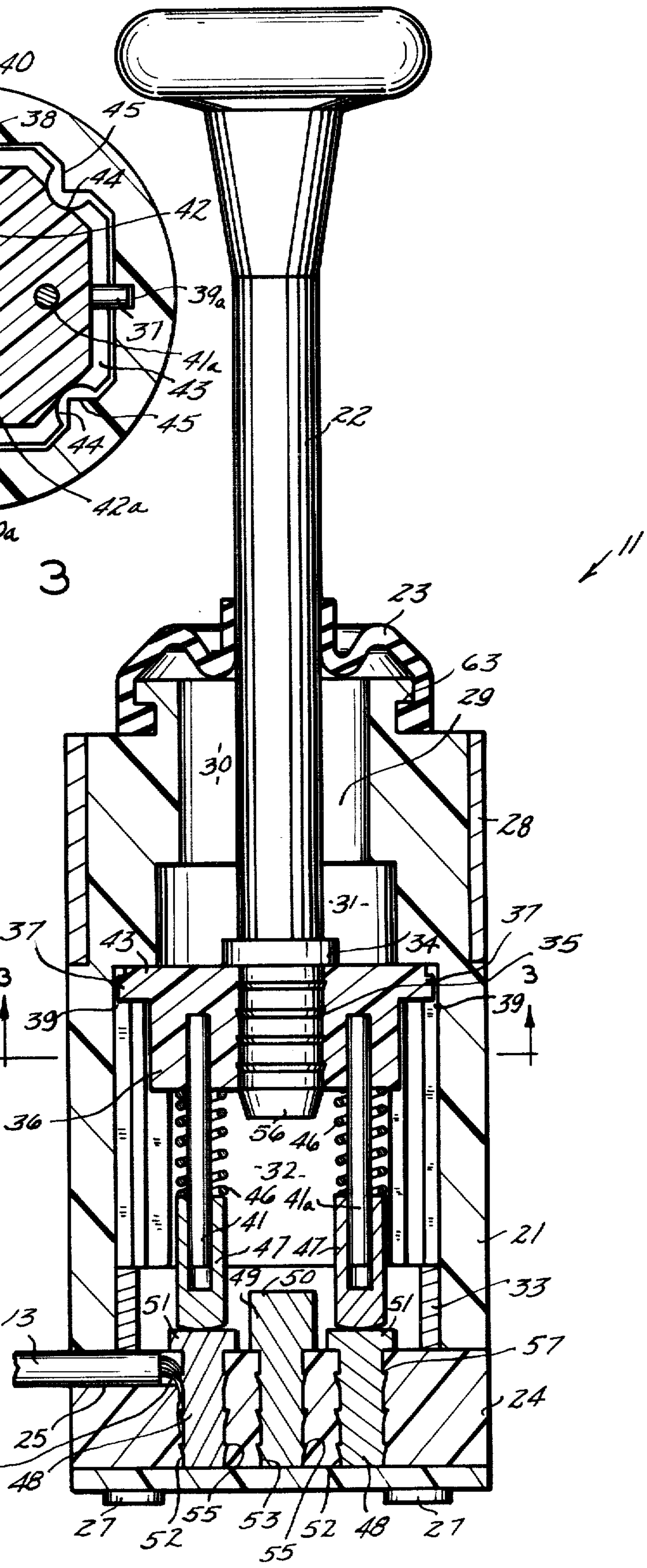
FIG. 2 is an enlarged side elevation full section view taken on line 2—2 through the switch of the present invention as seen in FIG. 1.
Figure 5:
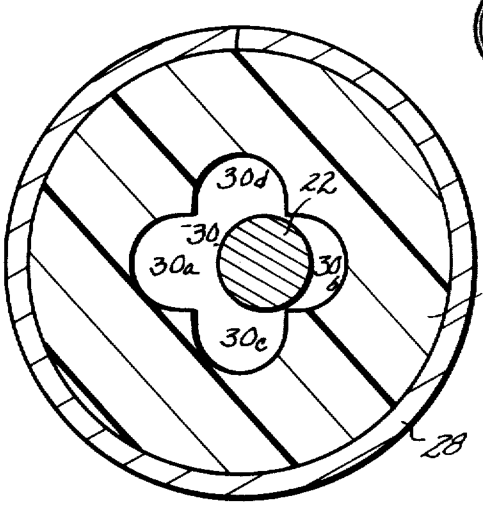
FIG. 5 is a cross-section plan view taken on the line 5—5 of FIG. 4 and indicating the controlled tilting of the switch handle in the switch case.

By reference to the FIG. 2, the inner construction of the switch 11 will be better appreciated. The elongate case 24 will be appreciated as provided with a central and axial cavity 29 which comprises the three connected axial cavity portions 30, 31, and 32. The case 24 is of non-conducting material such as a plastic capable of injection molding or forming as, for example, a styrene, polyethylene or polyvinyl material selected for dimensional stability, strength and cost. The cavity portion 30 will be seen to include four flank lobes or slots 30*a*, 30*b*, 30*c*, and 30*d* (FIG. 5) and the cavity 30 opens into the larger coaxial cylindrical opening 31 and the opening 31 expands into a still larger octagonal and slotted opening 32. At the lower end of the case 24 and in opening 32, an octagonal conducting annular ring 33 is fitted in place. The handle 22 extends axially through the case and includes a stop shoulder or flange 34 and an integral shank extension which is press fitted in a swage relation with wedge lock annuli 35 into an axial opening in an octagonally shaped switch plate 36. The switch plate 36 is made of non-conducting material such as the plastic material comprising the material of the switch case 24.

Figure 3:
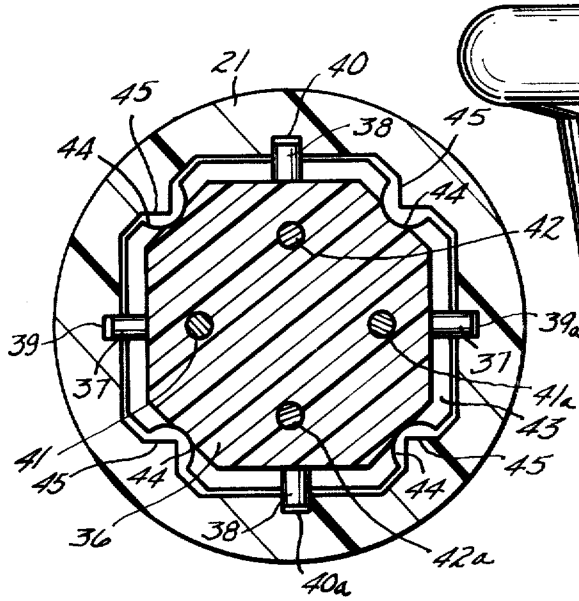
FIG. 3 is a cross-section plan view taken on the line 3—3 of FIG. 2 and through the non-conducting switch plate having limited universal tilting capabilities.

As will be appreciated, the switch plate 36 is controllably tiltable in the case 21 on transverse pivot axes or stubs 37 and 38 (see FIG. 3) which project from the generally octagonally shaped switch plate 36 and into elongate receiving slots 39, 39*a* and 40, 40*a*, respectively, provided in the interior wall of case 21. Depending from the lower side of the switch plate 36 are four guide pins 41, 41*a* and 42, 42*a*. The guide pins 41, 41*a* and 42, 42a depend in pairs in a square pattern, the pins 41 and 41a passing through the axis 37 and the pins 42, 42a passing through the axis 38. The switch plate 36 includes an upper flange 43 which is generally in octagonal form and includes guide grooves 44 which straddle the vertical protuberances 45 which extend inwardly from the walls of the cavity 32. As can be seen in FIGS. 2 and 3, the guide relationship of the axes 37 and 38 allows a limited tilting of the switch plate 36 on two axes without torsional or twisting movement. This restricts the movement of the handle 22 in prevention of rotation and confinement to two transverse planes at right angles to each other. The movement is additionally restricted by the lobes 30a and 30b impinging on the shank of the handle 22 when the handle 22 is moved from the axis of the switch 11. This geometry provides the two axes 37 and 38 for limited universal movement of the octagonal plate 36 and the guide grooves 44 on the vertical protuberances 45 located in octagonal sides adjacent the axes 37 and 38.

Springs 46 of the compression type are provided on each of the pins 41, 41a and 42, 42a. Then, each of the pins 41, 41a and 42, 42a is capped with cylindrical electrically conducting sleeves 47. This allows the tilting movement of the switch plate 36 while applying a centering bias to the switch plate 36 so that the handle 22 seeks return to registry on the vertical axis of the switch 11 when the handle 22 is released. The springs 46 also urge the sleeves 47 toward resilient contact with contactor elements 48 registrably located beneath the sleeves 47 when the switch 11 is in the centered position, as shown. When the switch plate 36 is tilted, then the springs 46 compensate for raising and lowering of the pins 41, 41a and 42, 42a. A center conducting contacting post 49 is located on the principal axis of switch 11 in spaced apart central relation to the contactors 48 and the headed portion 50 of the post 49 is above the general plane of the heads 51 of the radially clustered contactor elements 48. Thus, the sleeves 47 are in normal contact with their corresponding contactors 48. Upon movement of the handle 22, as will be seen in FIG. 4, one pair of sleeves 47 shift relative position so that in one extreme of selected travel of the handle 22, one of the sleeves 47 bridges between the conducting ring 33 and the contactor 48 serving the one sleeve 47. The opposite sleeve 47 bridges conductivity between the center post 49 and the contactor element 48 serving that sleeve 47. As will be appreciated, by reversing the rocking motion of the handle 22 in the same plane, the center post 49 and the conducting annulus or ring 33 engage the paired sleeve elements 47 in a reverse manner. Thus, if one of the conducting elements 49 is connected to a (positive) source of power and the ring 33 is connected to a ground (negative) connection, then power is passed into the leads 13 as the sleeves 47 are connected to the selected contactors 48, 49 and ring 33 and motors 14 and 15, respectively. This results in providing a means for reversal of polarity as between the extremes of travel of the switch 11 in each plane. Each plane thus serves a separate motor and the motors are made reversible. One motor 14 tilts the mirror glass 16 down in one drive direction and up in the reverse direction. The other motor 15 turns left in one drive direction and turns right in the other drive direction.

Compactness and precision registry with simplified assembly is achieved by the contactors 48 driven into perimeter guide openings 52 and center opening 53 (serving center post 49). The guide openings 52 and 53 are precision located in the closure plate 24 and are so sized as to allow the insertion of ends 54 of the leads 13 and the consequent keying of the strands of the leads 13 into the non-conducting material forming the closure plate 24 and clinching and electrically establishing a tight conducting relation as the contactors 48 and 49 are driven into the openings 52 and 53. The clinching and securing of the contactors 48 and 49 is by means of a flow relationship between the driven contactors 48 and 49 and the wall stock and conducting lead ends 54 flowing around the wedge flange annuli 55. The wedge flanges 55 are thus integrally formed in the stem portions of the contactors 48 and 49. A slight chamfer lead is provided on the inserted ends of each contactor 48 and 49 in somewhat the same manner as the larger leading chamfer 56 shown on the end of the handle 22 and below the similarly formed annuli 35. Upon entry, the wedge flanges 55 smoothly enter and the plastic or resin non-conducting material of the closure plate 24 closes behind the shoulder portion 57 of the wedge flanges 55 in prevention of removal. As will be appreciated, the leads 13 are all nested in their individual radially extending grooves 25 in the closure plate 24. In this manner, at assembly, the leads 13 are positioned in the grooves 25 with their ends 54 extending into the openings 52 and the contactors 48 and 49 are driven into the openings and are seated therein to the heads 50 and 51. This results in high precision location of the contactors 48 and 49, and excellent assurance of electrical connection between contactors and leads. The clinching of the contactors 48 and 49 in the closure plate 24 with compact radial extension of the leads from the closure plate 24 is thus achieved. Finally, the cover 26 is riveted into registry over the end of the closure plate 24. In similar manner, the electrical connection of the ring conductor 33 is achieved by the insertion of a contactor 48a through a tab opening 58 (FIG. 8) and its related lead 13 in the receptive opening 59 and channel or groove 25. The rivets 27 may also include the wedge flanges 55. Collaterally, a reduction in length of the switch 11 is achieved with substantial reduction in cost of manufacture and assembly. As will be appreciated, the length of the handle 22 is a matter of choice and may be shortened or lengthened depending on the location in the vehicle, the decorative impact, and the specific automotive design in which the mirror actuator 11 is included.

In the FIG. 3, as previously described, the movement of the switch plate 36 is best appreciated in relation to the guidance by the switch case 21 so as to provide four extremes of tilt position, two from each axis 37 and 38.

Figure 4:
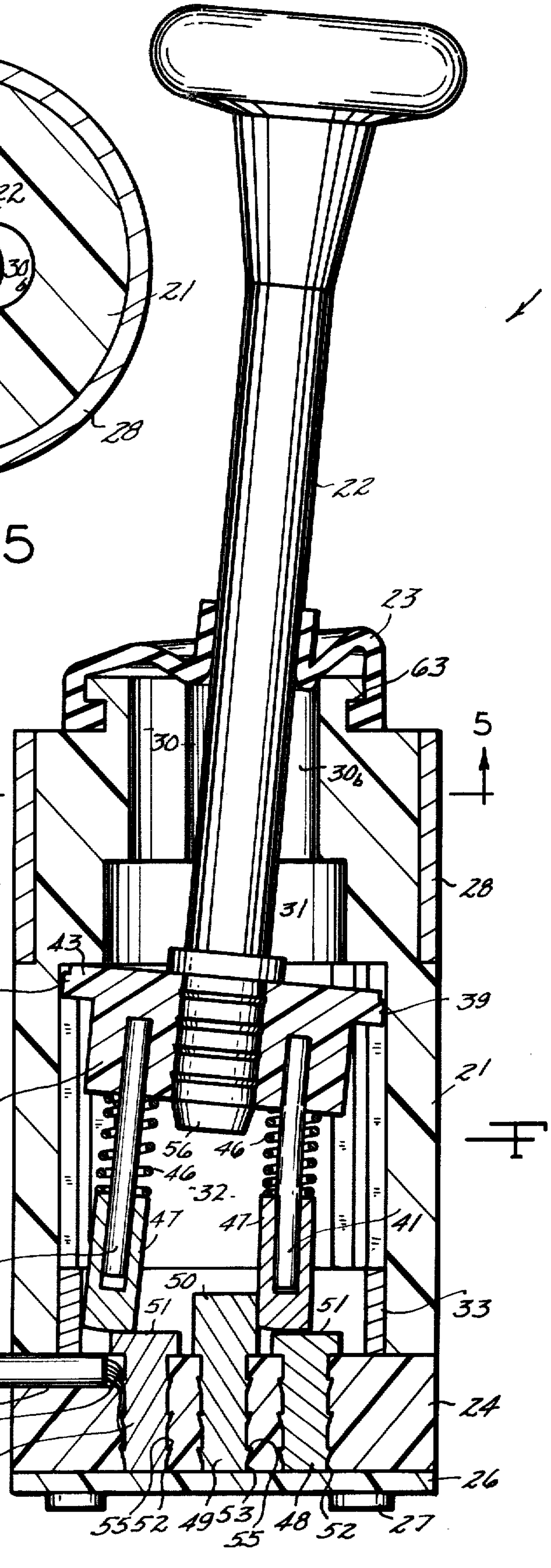

In FIG. 4, one position of tilting of the switch 11 is indicated and in other particulars the structure is substantially as described in FIG. 2. The FIG. 5 best relates the guide lobes 30a, 30b, 30c, and 30d of the opening 30 in control of the movement of handle 22 in the two intersecting planes. The mounting band 28 is also shown surrounding the case 21. The band 28 facilitates attachment of the actuator switch 11 to the vehicle.

Figure 7:
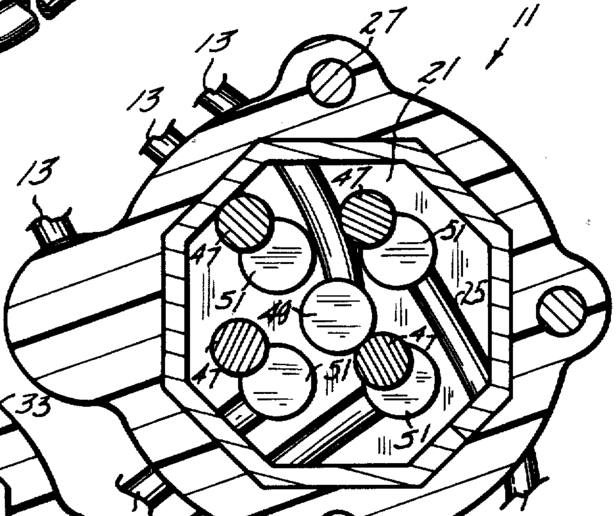
FIG. 7 is a section plan view taken on the line 7—7 of FIG. 1 through the contactor tips and indicating one of the four contacting positions of the switch of the present invention.
Figure 6:
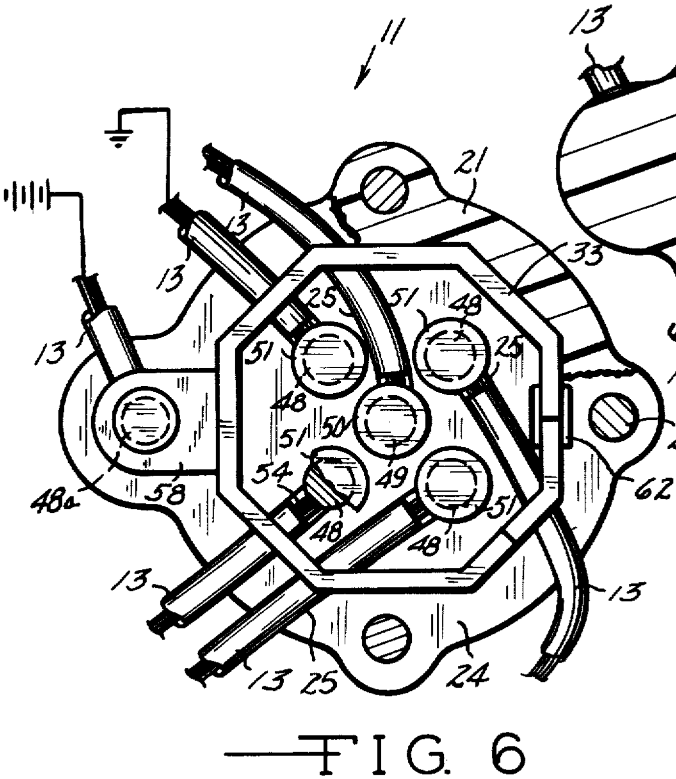
FIG. 6 is a partial section plan view taken on the line 6—6 of FIG. 1 and indicating the horizontal entry array of leads and connection thereof to contactors and posts and as positioned in the octagonal conducting ring and having a portion of the switch case cut away.

The FIGS. 6 and 7 best indicate the radial exit of the leads 13 and best illustrate simplicity of the closure plate 24 in respect to the function of the switch 11 as between the center biased position and the operational position upon movement of the conducting sleeves 47 into bridging contact with the center contactor 49 (ground) and with conducting bridging contact with the annular ring contactor 33 to the vehicular electrical power source as battery 60.

Figure 8:
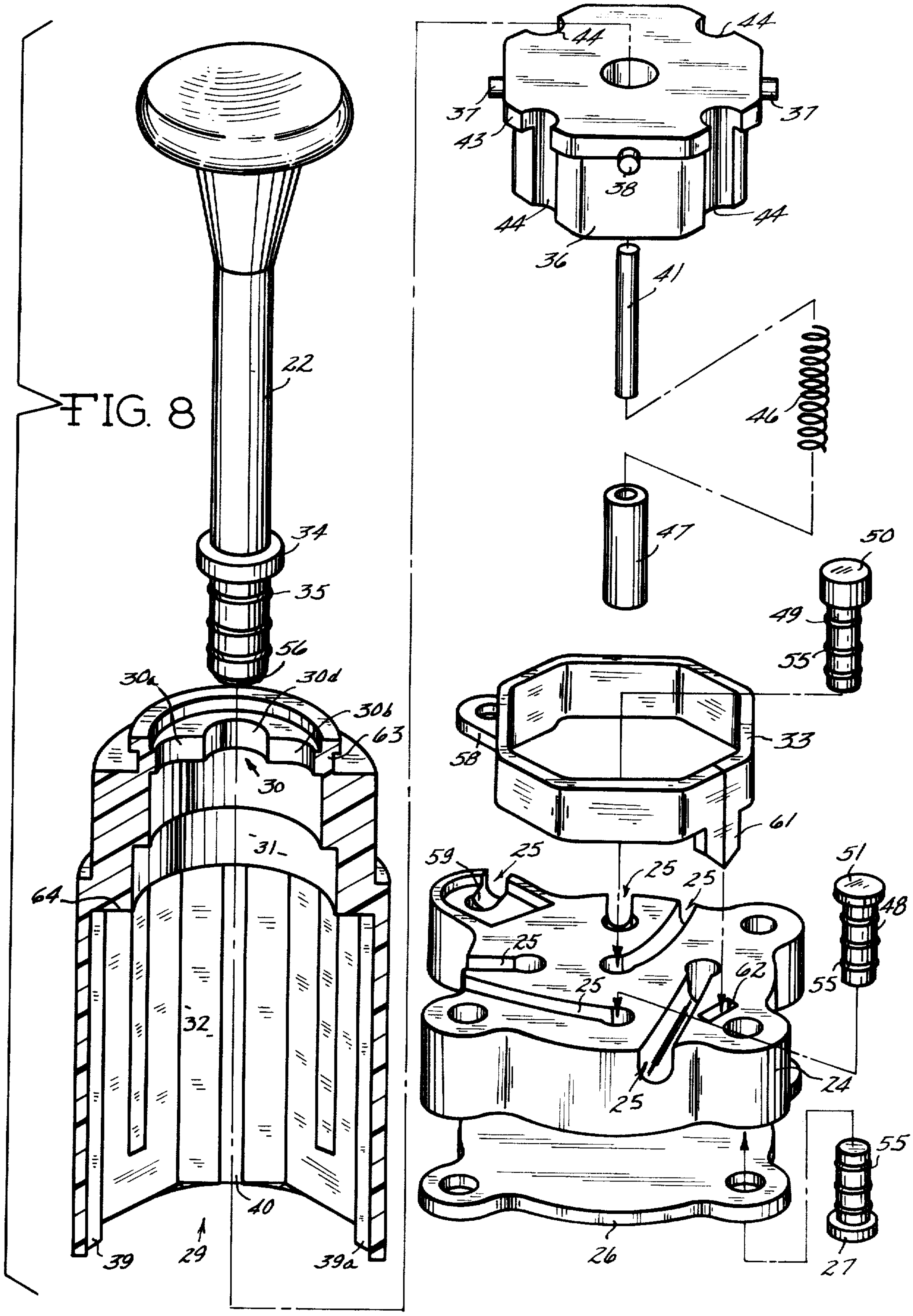
FIG. 8 is an exploded partially sectioned perspective view of the structural elements of the present switch with the exception of electrical leads and indicating the structural simplicity of the switch of the present invention and the ease of assembly.

Assembly and simplicity is best appreciated by considering the integration of wiring in the closure plate 24 as described in FIGS. 6 and 7 and appreciating in FIG. 8 that the construction is compact by reason of the radial disposition of the leads and the unique connecting and assemblage of contactors, leads, and precision location with attachment of the octagonal conducting ring 33 by inserting the prong 61 of the ring 33 into the registry recess 62 so that subassembly of ring 33 to closure 24 and with contactor fasteners 48 and 49 and with closure by rivets 27 to allow the full closure of the actuator end. The assembly is in coaxial relation to the case 21 which separately includes the guided switch plate 34 pressed onto the handle 22 and with the pins 41 depending therefrom as guides for the springs 46 and conducting sleeves 47. The step or flange 63 at the top of the switch case 21 accommodates the boot cover 23. The handle 22 is inserted axially in the case 21 and pressed onto the switch plate 36 as previously described. The plate 36 is loaded into the opening 32 by orienting the axes 37 and 38 in the guide slots 39, 39a and 40, 40a to engagement against the internal shoulder 64. The flange 34 of the handle 22 passes through the opening 30. This allows substantial reduction in length of the handle 22 and the springs 46 acting against the sleeves 47 assure both centering bias of the handle 22 and following moving contact of sleeves 47 to any contacting surface.

In operation, the actuator of the present invention is simple and economical and provides a precision and reliability with compactness of length that is highly desirable. The switch mimicks the position capability of the cable actuated actuators and, as will be seen, features are adaptable to other switch and contactor constructions in providing a radial disposition of contact leads and a means for precision locating and clinching of contactor elements while establishing electrical contact.

Having thus described our invention and the preferred embodiment thereof, those skilled in the art will readily perceive improvements, changes and modifications thereof and such improvements, changes and modifications are intended to be included in the scope of the invention limited only by the scope of our hereinafter appended claims.

We claim:

1. In an electrically operated remote control rearview mirror structure having a pair of reversible drive motors, one drivably connected to move said mirror in one plane of motion and the other drivably connected to move said mirror in another plane for limited universal placement, the actuator control structure comprising:

a remotely connected switch having a first pair of opposed positions selectively operating one of said motors in a forward direction and in a reverse direction and said switch having a second pair of opposed positions and selectively operating the other of said motors in a forward and in a reverse direction;

bias means acting upon release of said switch and self-centering said switch to a neutral non-driving position;

a plurality of leads radially extending from the base of said switch to said motors;

a source of electrical energy connected to said switch;

a ground connected to said switch;

means actuated upon guided movement in said switch to close a circuit to one of said motors in selected forward and reverse and separately to the other of said motors in selected forward and reverse; and a base closure on said switch having radial openings through which said leads radially extend and said base closure terminally supporting said leads in locating and electrical contact with said leads and said means.

2. A reversing switch structure for selected reversing control of two drive vectors comprising:

a non-conducting tubular elongate switch body having longitudinal guide slots in the walls thereof in opposed spaced apart registry and having a central lobed aperture, said aperture having interconnected lobes in similar-sense registry to said guide slots;

a non-conducting base closure plate closing the end of said switch body opposite said lobed aperture and said closure plate having four contactors, each in radial aligned spaced apart relation to said slots and a central contactor in spaced central radial relation to said four contactors;

an octagonal sided contactor ring fitted inside said switch body and resting on closure plate in spaced apart perimeter relation to said four contactor posts and said central contactor;

a conducting lead from each of said contactors, from said central contactor and from said contactor ring and radially extending from said platform;

an elongate operating handle extending through said aperture in said body;

a non-conducting switch plate connected to said handle and movable thereby and guidably poised for limited tilting by impingement in said slots and said lobes; and spring loaded conducting sleeves in contact register with said four contactors and supported by said switch plate, said switch plate selectively movable by manual operation of said handle so as to result in contact of one of said contactors through said one of said sleeves to said center contactor and contact of the opposite of said contactors through an opposite one of said sleeves to contact with said contactor ring in accord with any guided movement of said handle and said switch plate in four extreme positions.

3. A reversing switch in accord with claim 2 in which said leads are connected to said contactors, said center contactor and to said contactor ring at a radially tabbed lead and said leads extending outboard of said closure plate.

4. A reversing switch in accord with claim 2 in which said contactors and said central contact are drivably connected to the ends of each of said leads by wedge induced friction and by displacement in receiving openings in said closure plate.

* * * * *